United States Patent [19]
Towers

[11] Patent Number: 5,836,583
[45] Date of Patent: Nov. 17, 1998

[54] DETECTION SYSTEM FOR DETECTING A POSITION OF A BALL ON A ROULETTE WHEEL

[75] Inventor: Paul Towers, Preston, United Kingdom

[73] Assignee: Technical Casino Services Ltd.

[21] Appl. No.: 737,304

[22] PCT Filed: Apr. 25, 1995

[86] PCT No.: PCT/GB95/00933

§ 371 Date: Oct. 24, 1996

§ 102(e) Date: Oct. 24, 1996

[87] PCT Pub. No.: WO95/28996

PCT Pub. Date: Nov. 2, 1995

[30] Foreign Application Priority Data

Apr. 26, 1994 [GB] United Kingdom .................. 9408252

[51] Int. Cl.[6] ....................................... A63F 5/02
[52] U.S. Cl. ................................. 273/142 B; 273/142 D; 273/142 E; 463/17
[58] Field of Search ..................... 273/142 E, 142 D, 273/142 B; 463/17

[56] References Cited

U.S. PATENT DOCUMENTS

| | | | |
|---|---|---|---|
| 4,396,193 | 8/1983 | Reinhardt | 273/142 B |
| 4,730,108 | 3/1988 | Rodal et al. | 250/221 |
| 4,732,385 | 3/1988 | Castellanos | 273/142 E |
| 4,869,505 | 9/1989 | Manabe | 273/142 E |

FOREIGN PATENT DOCUMENTS

| | | | |
|---|---|---|---|
| 160157 | 11/1985 | European Pat. Off. | 273/142 E |
| 292465 | 5/1988 | European Pat. Off. | |
| 2656024 | 6/1978 | Germany . | |
| 3403018 | 8/1985 | Germany | 273/142 E |

*Primary Examiner*—Benjamin H. Layno
*Attorney, Agent, or Firm*—Harrison & Egbert

[57] ABSTRACT

A detection system for detecting the position of an object of a movable member and, In particular, for detection the position of a ball in a moving roulette wheel which has a light source for emitting visible light which is modulated. A sensor is provided to receive reflections of the emitted modulated light from the ball and the moving roulette wheel. The reflections are analyzed to determine the position of the member and the location of the objection in relation thereto. The light source can transmit light and the sensor can detect specific similarly modulated wavelengths which are predetrmined dependent upon the relative chrominance of the number ring and the pocket ring of the wheel.

16 Claims, 4 Drawing Sheets

DETECTION SYSTEM FOR DETECTING A POSITION OF A BALL ON A ROULETTE WHEEL

TECHNICAL FIELD

The present invention relates to a detection system for detecting the position of an object on a movable member. It has particular but non-exclusive application to the detection of the position of a ball in a moving roulette wheel.

BACKGROUND ART

Systems to detect the position of the ball in a moving roulette wheel are used both to illuminate a display to indicate the winning number to the punters and to collect information for statistical processing. The latter enables the casino to check that the wheel and its croupier are operating fairly and without bias.

In one conventional detection system three infra-red lasers are used, two of which are aimed at the numbers region of a roulette wheel and one of which is aimed at the ball pockets. Another system uses broad area infra-red irradiation with triple focused optics and sensors on the same regions. Both of these systems then detect infra-red radiation which has been reflected by the roulette wheel and the ball in order to determine the direction of rotation of the wheel and its angular velocity, to detect the ball, and to identify in which pocket of the wheel the ball is in when it has come to rest. A third system uses an infra-red emitter and sensor to detect the ball but detects the angular position of the rotating cylinder of the wheel by means of a detector mounted under the cylinder. The wheel below the cylinder is drilled and a plate with a printed bar code is attached to the underneath surface of the cylinder so that it can be viewed by the detector. This can introduce bias into the rotation of the cylinder.

One disadvantage of all these systems is that the infra-red emitters and the detectors must of necessity be firmly attached to the wheel, typically by screws or bolts. This involves damage to the roulette wheel itself, which is undesirable from an aesthetic standpoint and makes it difficult to move the wheel, which is usually turned periodically to prevent uneven wear of both the bearings and the static wheel rim. In addition, all of these systems require precise adjustment and must be set up by a skilled person with special equipment and tools who can ensure that the infra-red emitters and detectors are orientated correctly.

A fourth conventional system uses a CCTV camera or CCD array with suitable optics, arranged so as to view the interior of the wheel, together with appropriate image processing. This system is a passive system as it does not emit any radiation and it avoids damage to the wheel. However, the image processing techniques involved are of inherently low physical precision. Whereas the first two systems utilise a static reference point on the rim of the wheel in association with a rotating cylinder, this technique sees in effect a static cylinder and moves a virtual reference point around it.

All four systems described above face several severe difficulties.

The light signals reflected from both the numbers region of a wheel and the ball are typically diffuse in nature and thus weak relative to the general illumination of the wheel. Furthermore the reflectivity of these components and materials is not controlled within the infra-red spectrum. It is fallacy to assume that because something is reflective in the visible spectrum it is reflective in the infra-red also: it is often the opposite of what one might intuit. Plastics are commonly transparent to the near infra-red irrespective of their apparent colour to the human eye; equally some plastics and dyes are absorbent within this spectral region and thus appear black to a sensor. There is usually a difference in the level of the reflected component but this is uncontrolled, accidental and typically small in magnitude. Any reliance on infra-red irradiation, though it can be used to some effect at sufficiently high power levels, is fraught with uncertainty and inherently unpredictable in its performance on roulette wheels of arbitrary and uncontrolled manufacture.

A roulette table overall is typically illuminated by spotlights of arbitrarily high power and orientation which generally also source very substantial amounts of infra-red radiation. The sensitivity of a silicon photodetector increases significantly with increasing wavelength, through the visible and into the near infra-red: thus any system passively using the ambient lighting must potentially deal with a very large dynamic range as the reflected signals become progressively smaller in proportion to the ambient.

Another and very serious obstacle to a passive sensor system exists when the ambient illumination is modulated at twice the power line frequency, i.e. 100 Hz in the United Kingdom. This large amplitude modulation occurs due to the cooling of lamp filaments in the low voltage portion of a.c. drive: it is also present in fluorescent sources for analogous reasons. Thus a sensor will see a substantial 100 Hz component.

In DE-A-26 56 024 is disclosed a position-finding apparatus for the ball of a roulette wheel which uses ambient illumination to illuminate the wheel. The ball is detected by the use of coded patterns which are located in the bottom of each of the pockets of the wheel; the particular pocket containing the ball being determined as a result of the ball obscuring the pattern. Such a detection system, however, requires the roulette wheel to be modified, which is undesirable aesthetically.

In addition to the foregoing, roulette wheel pockets are typically separated by silver or brass separators. These each form a specular reflecting surface which can generate a high intensity flash on the optical detector dependant on the arbitrary relative positions of the ambient lighting, wheel and detector. Other surfaces both within and outside the wheel rim can similarly generate large specular reflections. If the specular reflection is static it compounds the problems of dynamic range: if flashing at pocket frequency an optical mixing process takes place which severely distorts the signals as well. A passively illuminated system will incur very high signal processing complexity to overcome the effects of separator flashes.

SUMMARY OF THE INVENTION

The object of the present invention is to provide a detection system for use in the detection of the position of a ball in a moving roulette wheel which substantially overcomes the aforementioned difficulties.

According to a first aspect of the present invention there is provided a detection system for detecting the position of an object on a movable member comprising a light source operative to emit visible light, a sensor operative to receive reflections by the object and the movable member of said emitted light, and means for analysing said reflections to determine the position of the member and the location of the object in relation thereto, and characterised in that the light source emits light of one or more specific wavelengths which have been modulated and the sensor is operative to detect one or more similarly modulated wavelengths, said wavelengths being predetermined dependent on the relative chrominance of the member and the object.

Preferably, the modulated light source is operative to transmit light over the broadband visible light range which has been modulated and the sensor is operative to detect one or more specific similarly modulated wavelengths, which are predetermined dependent on the relative chrominance of the member and the object.

Alternatively, the light source is operative to transmit light of one or more specific wavelengths which have been modulated and which are predetermined dependent on the relative chrominance of the member and the object, and the sensor is operative to detect similarly modulated wavelengths over the broadband visible light range.

In the latter case, preferably the light source comprises at least three individual light sources, two of which are directed at spatially displaced positions of a first predetermined area of the movable member in order to determine its direction of movement and velocity, and at least one of which is directed at a second predetermined area of the movable member to detect the presence of the object, the frequency of the light emitted by said at least one light source being selected in order to maximise the chrominance contrast between the object and said second predetermined area of the member.

According to a second aspect of the present invention there is provided a roulette wheel comprising a static outer portion within which is mounted a rotatable cylinder with an outer numbers ring and an inner ring of pockets, and a detection system according to the first aspect of the invention mounted on the outer portion, said two individual light sources being directed at the numbers ring of the cylinder and said at least one individual light source being directed at the ring of pockets.

According to a third aspect of the present invention there is provided a method of detecting the position of a ball on a roulette wheel with a rotatable cylinder comprising the steps of illuminating a numbers ring of the cylinder with light from two spatially displaced light sources;

illuminating a ring of pockets of the cylinder with light to detect the presence of a ball;

sensing reflections of said illuminating light by the numbers ring, the ring of pockets and the ball; and analysing the reflections to determine the angular position of the cylinder within the wheel and the location of the ball relative thereto, and characterised in that the illuminating light comprises light of one or more specific wavelengths which have been modulated, and the sensed reflections comprise one or more similarly modulated wavelengths, said wavelengths being predetermined dependent on the relative chrominance of the member and the object.

DETAILED DESCRIPTION OF THE INVENTION

Figure 1:
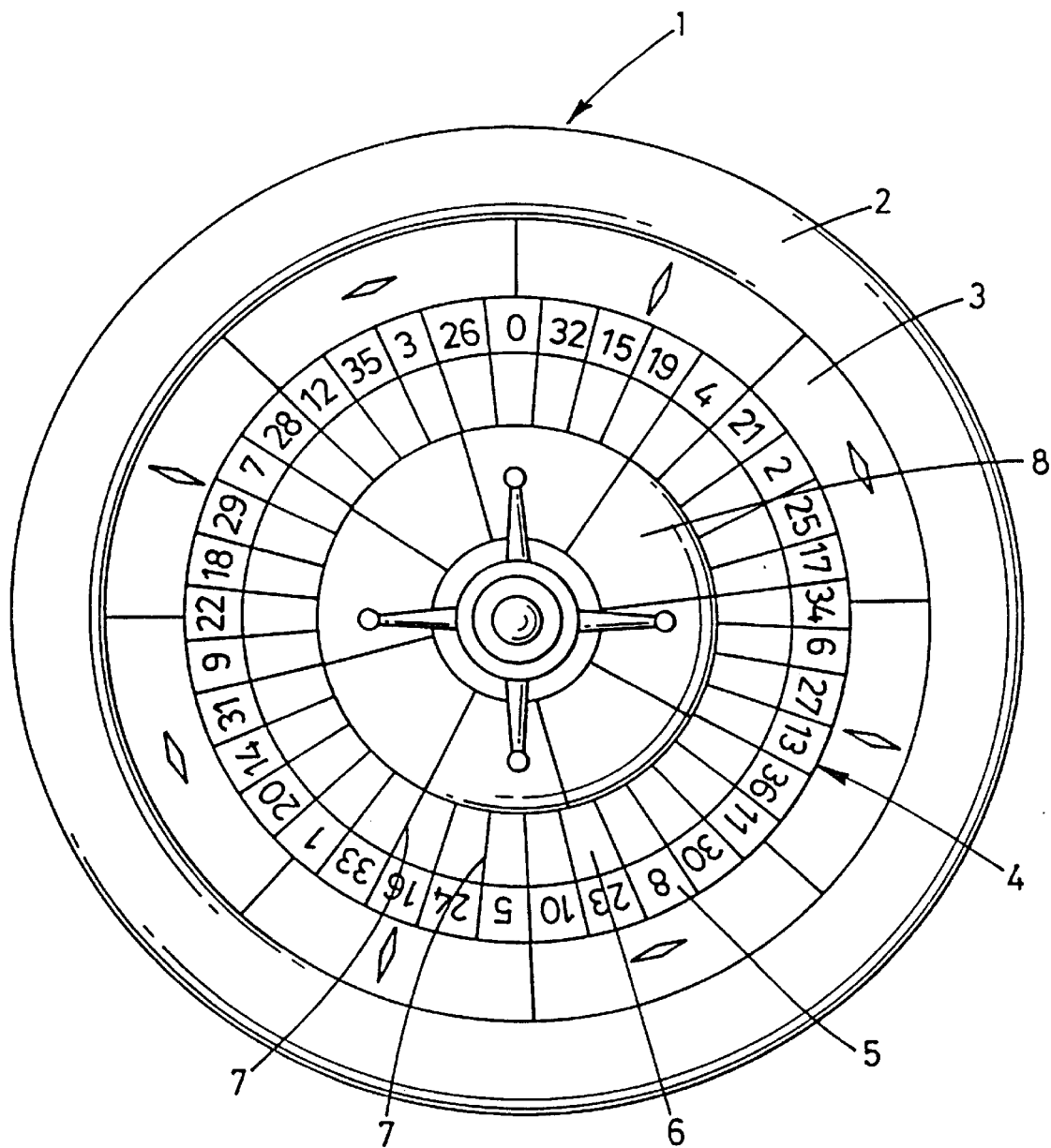
FIG. 1 is a diagrammatic plan view of a roulette wheel.

With reference to FIG. 1, a conventional roulette wheel 1 comprises an annular casing 2 containing a static inwardly sloping rim 3 within which is mounted a rotatable cylinder 4. The cylinder 4 comprises an outer numbers ring 5 and an inner ring of pockets 6 both of which are arranged concentrically with the cylinder. Each pocket 6 is individually numbered by the numbers of the numbers ring 5 and isolated from its neighbouring pockets by upstanding separators 7. Inwardly of the ring of pockets 6 is a central domed area 8.

As is known, in use the cylinder 4 is spun in one or other direction and then a ball is projected to run around the rim 3 inside the casing 2. The ball may be projected either in the same direction as the direction of rotation of the cylinder 4 or in the opposite direction. As the ball slows down, the centrifugal force required to keep it within the rim 3 of the wheel 1 becomes greater than it can sustain and consequently it falls down the rim 3, over the number ring 5, where it may bounce off one or more separators 7 or the dome 8, before eventually landing in one of the pockets 6, which becomes the winning pocket.

As dictated by convention and the usual rules of the game, the numbers in the numbers ring 5 are each shown against an alternating black and red background. However, the number zero, which may occur once or twice dependent on the rules of the game being followed is shown against a green background. The individual numbers themselves are always in the same predefined sequence in relation to the number zero. Thus, if the position of the green areas of the numbers ring 5 can be determined, then this can provide a marker by means of which the direction of rotation, angular velocity of the cylinder 4 and the relative location of all of the pockets 6 can be determined. In addition, it will be appreciated that when the relative position of a ball located in one of the pockets 6 is known, the number of that pocket and its colour can also be determined.

To this end unlike the prior art systems described above, the detection system of the present invention uses modulated visible light to illuminate the numbers ring 5 and the pockets 6 of the roulette wheel 1. As the wheel and ball, which is usually near white, are coloured to present maximal contrast in the visible spectrum so that humans can best see what is happening, the use of visible light also enables the present system to retain control and consistency of measurement.

Figure 2:
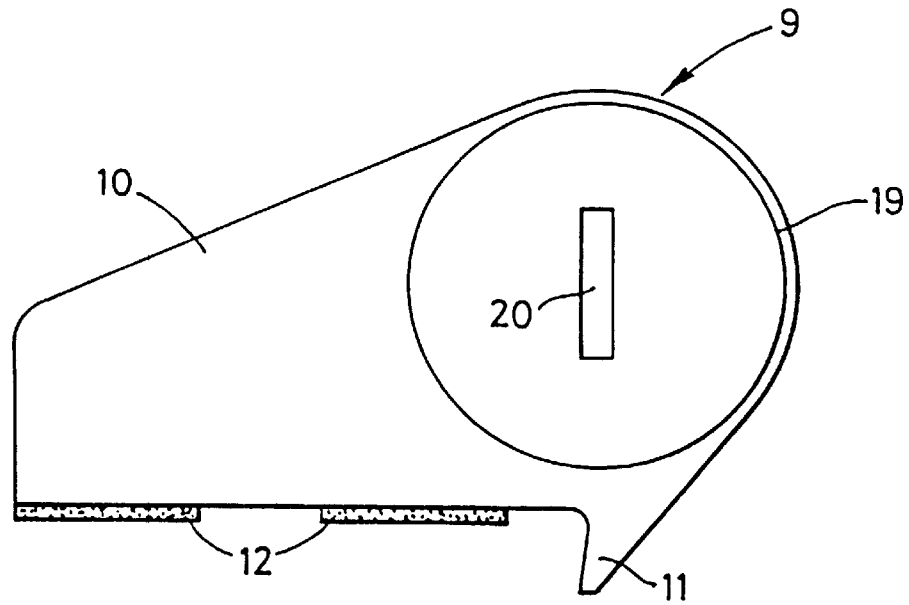
FIG. 2 is a side elevation of a detector which forms part of the detection system according to the invention and which is for use with a roulette wheel such as shown in FIG. 1.
Figure 3:
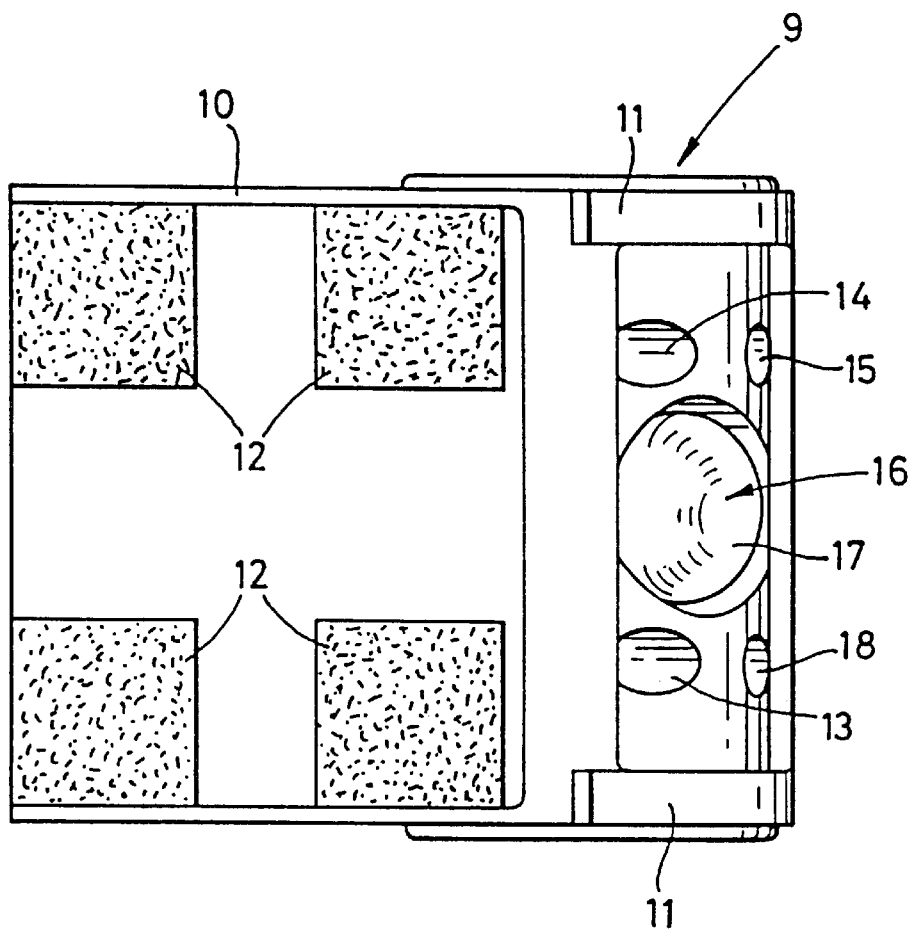
FIG. 3 is an underplan view of the detector shown in FIG. 2.

The detection system comprises a detector 9, a first embodiment of which is shown in FIGS. 2 and 3, which in use is linked to a microprocessing means and a display board, neither of which is shown. The detector 9 is designed to be mounted on the annular casing 2 of the roulette wheel 1 and comprises a housing 10 which defines a pair of spurs 11 which hook over the inner edge of the casing 2. Preferably, the detector 9 is additionally attached to the casing by means of either a mechanical clamp (not shown) but more preferably by adhesive strips/rubber pads 12 or impact fastening pads 12 such as those sold under the trade mark VELCRO™. It will be appreciated that these means of attachment of the detector to the wheel 1 do not cause permanent damage to the wheel 1. In addition, attachment of the detector 9 can be carried out by a relatively unskilled person.

The housing 10 contains three light sources 13, 14, 15 and a sensor 16 disposed behind a lens 17. The sensor 16 is preferably a silicon photodiode sensor. A fourth light source 18 working in phase with one of the other light sources 13, 14, 15 may also be included in the detector 9. The light sources 13 and 14 are used to illuminate the numbers ring 5 of the wheel to determine the direction, angular momentum and relative position of the cylinder 4 whereas the light source 15 is used to illuminate the ring of pockets 6 to detect the ball. Preferably, the fourth light source 18 works in phase with the light source 15.

Although of all the light sources, the sources 13 and 14 are shown closest to the underside of the housing 10 in FIGS. 2 and 3, there is no reason why these could not be positioned where sources 15 and 18 are located and vice versa.

Each of the light sources 13, 14, 15, 18 and the sensor 16 is disposed in an appropriate aperture formed in a cylindrical drum 19 which is rotatably mounted in the housing 10. One end of the drum 19 is provided with a slot 20 to provide a keyway by means of which the orientation of the drum 19 and thereby the position of the light sources 13, 14, 15, 18 and the sensor 16 can be adjusted relative to the wheel 1 Because the light sources 13, 14, 15, 18 emit visible light, it is a relatively simple matter to rotate the drum 19 using a screwdriver or coin so that light from the sources 13, 14 substantially illuminates the numbers ring 5 and light from the sources 15 and 18 substantially illuminates the ring of pockets 6. As the position of the sensor 16 is fixed relative to the light sources, 13, 14, 15, 18 then once the latter have been correctly positioned, the sensor is automatically correctly positioned so as to be able to receive light which has been emitted by the sources 13, 14, 15, 18 and reflected back by the numbers ring 5 and the pockets 6, one of which may contain the ball.

The position of the detector 9 on the edge of the casing 2 relative to the cylinder 4 also tends to ensure that specular reflection of light emitted by the light sources 13, 14, 15, 18 by the separators 7 and other reflective surfaces of the cylinder 4, is directed away from the sensor 16.

The key to achieving good discrimination of an object against a background of similar luminance lies in maximising the colour or chrominance contrast between the object, in this case a white ball, and its background. As previously described, the background colours of the numbers ring 5 are alternate red and black with either one or two green backgrounds inserted depending on whether a single or double zero wheel is used. The pockets 6 may or may not be coloured but if so will be coloured similarly to the numbers ring 5. One type of wheel has a silver reflective pockets ring.

The detection apparatus can, therefore, either illuminate the cylinder 4 with modulated white light and sense specific similarly modulated wavelengths, or illuminate the cylinder 4 with specific modulated wavelengths and sense similarly modulated wavelengths over the broadband visible light range.

Both of these methods will work equally well but the second is easier to implement owing to the difficulties involved in achieving a high frequency modulated white light source. Various methods are available to implement the first method, such as rotating vane, piezo-electric or LCD shutters but these are usually bulky, slow or expensive and thus less desirable. Also multiple sensor channels are required, one for each spectral wavelength sensed, which increases the expense and complexity of the system.

Preferably, therefore, the light sources 13, 14, 15 and 18 comprise specific wavelength LEDs (light emitting diodes) which have intrinsic lenses to direct the light, can generate usefully high powers and are relatively inexpensive. The light sources 13, 14, 15 and 18 do not have to comprise LEDs, other suitable light emitters can be used.

This method has the further advantage it only requires one sensing, optical receive channel, with consequent savings in optics and signal conditioning.

In order to detect a white ball in a red pocket we can illuminate with yellow, green or blue light. To see it in a green pocket requires red, yellow or blue illumination. Thus either yellow or blue light can be used to detect both conditions of the ball. As maximal contrast is obtained by using a wavelength that is spectrally distant from that of the background pocket, blue light is the more preferable, it being furthest from both red and green . If yellow light i s used it should preferably comprise yellow light at approximately 565 nm which is spectrally equidistant between red and green light.

Currently, blue LEDs are expensive and of low power. They are, therefore, less practical to use at the present time than a yellow LED emitting in the region of 570 nm. Thus such LEDs are used for the light sources 15 and 18 which are employed for ball detection. As yellow light is spectrally relatively close to both red and green light there is some reflection from both red and green pocket backgrounds but this is small in relation to that from a white ball. Signal contrast ratios of 5:1 for ball to background are normal. Should a suitable blue light source become available it is anticipated this figure would improve substantially.

In order to detect the angular position of the cylinder 4, as previously stated the position of the green area or areas of the numbers ring 5 must be determined. There are typically 37 or 38 number-pocket positions, depending on whether the wheel 1 is single or double zero, which are always in a defined sequence. In the case of a single zero wheel 1, the green area lies between red and black areas; in the case of a double zero wheel 1, one green area lies-between two red areas and the other between two black areas. Thus, to synchronise it is necessary to detect the green position either expressly or as always being in a red or black equivalent condition: the system according to the present invention detects green as a black equivalent. Hence, with a single zero wheel two successive black areas are detected and with a double zero wheel three successive black areas are detected. These each mark a unique exception in the cycle of alternate red/black areas around the numbers ring 5.

In order to detect the green areas as equivalent to black, the numbers ring 5 is preferably illuminated by two red LED light sources at a wavelength of approximately 670 nm. This wavelength is spectrally as far as possible from that of green light whilst remaining in the visible region and ensures the green is seen as black. Hence, the conjunction of black and green pockets is seen as a double black exception which is then used as a reference marker to synchronise to the cylinder position. The use of this or slightly longer wavelengths enhances system sensitivity by virtue of the increasing sensitivity of the silicon photodiode sensor 16 to longer wavelengths in this region.

Once detected by the sensor 16, the red/black numbers signal is transmitted to a microprocessor and effectively comprises an angular position clock to the software which then locks a phase and frequency analogue to it and synchronises position to the green exception. Thus the microprocessor can deduce the angular position of the rotating cylinder 4 with respect to the detector 9 whilst the cylinder 4 is in motion. When a ball is detected in a pocket 6, this is correlated to the known position of the cylinder 4 and the relating number computed by association.

Two red light sources are used in physically slightly displaced positions so that a spatial difference is created in the signal. This enables the direction of rotation of the cylinder 4 to be deduced by using the technique of phase quadrature. If two left-right displaced measurements of red/black data from the numbers ring 5 are made, the physical displacement creates a time or phase difference in the received signal which if the left precurses the right implies that the direction is anti-clockwise and vice versa. Thus by making reliable measurement of the colour of the numbers ring 5 on the cylinder 4 at some arbitrary but stable reference point relative to or on the wheel casing 1 or rim 3 and concurrently detecting the presence of a ball in the associated pocket the winning number for a game spin can be identified and data in respect of the angular velocity and direction of rotation of the cylinder gathered and assessed.

Thus, in this embodiment, the light sources 13 and 14 which are arranged to illuminate the numbers ring 5 for rotational information comprise two red LEDs emitting at 670 nm. The light sources 15 and 18 which are arranged to illuminate the ring of pockets 6 in order to sense the ball comprise a pair of yellow LEDs emitting at 570 nm.

In operation, the light sources 13, 14 and the pair 15 and 18 are modulated and activated in turn. Thus the sensor 16 receives similarly modulated reflected light from each of these sources in turn. The resulting signals produced by the sensor 16 are then transmitted to electronic means for analysing the reflected light condition, which sample demodulate and direct the signals to appropriate microprocessor means to give speed and direction of rotation of the cylinder 4, and in due course the ball position at rest in a pocket; these values may then be visually displayed and are stored or transmitted to provide data for statistical analysis.

Figure 4:
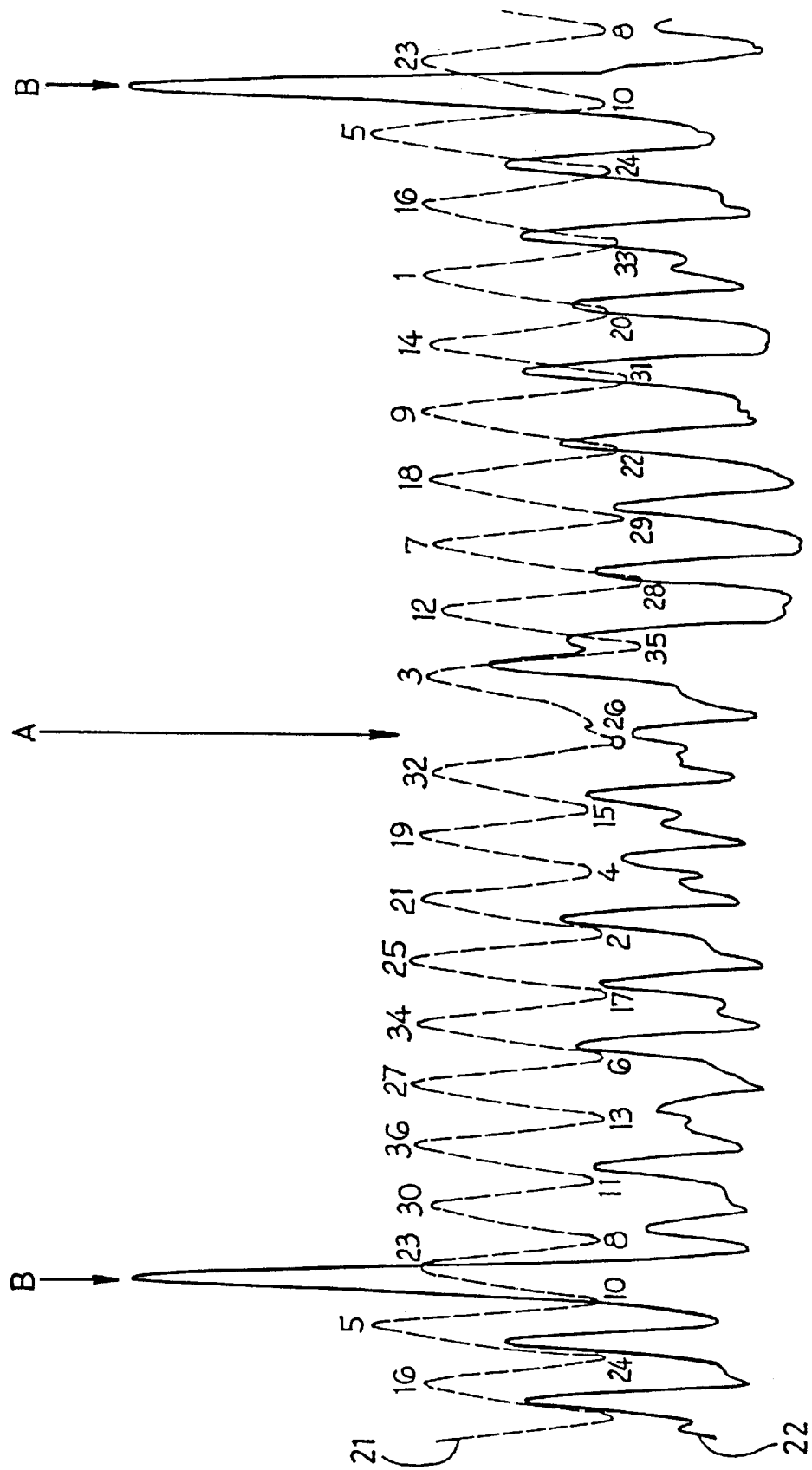
FIG. 4 is a graph showing signals received over a period of time equivalent to at least one revolution of a roulette wheel by a sensor forming part of the detection apparatus shown FIGS. 2 and 3.

The resulting signals output by sensor 16 are illustrated in FIG. 4. Here, the amplitude of each received light signal is shown against time for just over one revolution of a cylinder 4 with a single green zero. The upper trace 21 (shown in broken lines) shows the peaks and troughs of one of the red light sources 13, 14. The peaks synchronize with the passage of red areas of the numbers ring 5 past the sensor 16 whereas the troughs synchronize with the passage of black and green areas past the sensor 16. At the point where adjacent green and black areas pass the sensor 16, a double black trough is detected, as indicated by the arrow A. Thus, as soon as the position of a green area has been detected, the number associated with each of red peaks and black troughs can be deduced, as is indicated by the numbers shown adjacent thereto.

The lower trace 22 shows the signal received from the ring of pockets 6. Here again a sequence of peaks and troughs synchronized with each of the pockets is produced as they pass the sensor 16. However, when the ball lands in one of the pockets, being white it reflects the emitted yellow light back to the sensor 16 better than the pockets themselves. This results in a large peak, as indicated by the arrows B, being produced for the pocket in which the ball lies. The position of this peak can then be related to the peaks and troughs produced by the numbers ring 5 so that the number of the winning pocket can be deduced. In FIG. 4, it can be seen that the lower trace 22 is offset to the right slightly with respect to the upper trace 21. Hence, each peak B is related to the preceding peak of the upper trace 21 indicating that the ball is in the pocket numbered 5.

Preferably, the frequency of light modulation is in the region of 125 kHz. As previously stated, one of the disadvantages of conventional passive systems is that the ambient illumination is modulated at twice the electrical supply. line frequency, which is 100 Hz in the United Kingdom. It is necessary either to filter out this frequency or to modulate exactly in phase with it. Practically, it is simpler to filter out the 100 Hz ambient signal and in this case it is preferable to choose a higher modulating frequency because a frequency lower than 100 Hz may become close to the frequency of rotation of the cylinder 4. Whilst this could be accommodated, there is no reason not to use a higher modulating frequency on the grounds of cost and one of approximately 125 kHz is comparatively easy to achieve.

Alternatively, however, the frequency of modulation could comprise an integer multiple or integer reciprocal of the electrical supply frequency.

In addition to deducing the winning pocket and collecting data for statistical analysis, it would also be highly desirable to measure the angular velocity and direction of the ball whilst it is spinning in the rim 3 of the roulette wheel 1 and prior to its falling to rest in a pocket 6 both in order to counter certain forms of fraudulent operation and to call automatically for an end to the placement of bets i.e. to signal an appropriate moment for the "rien ne va plus" call by the croupier. To this end a second embodiment of detector can be produced as shown in FIG. 5.

Figure 5:
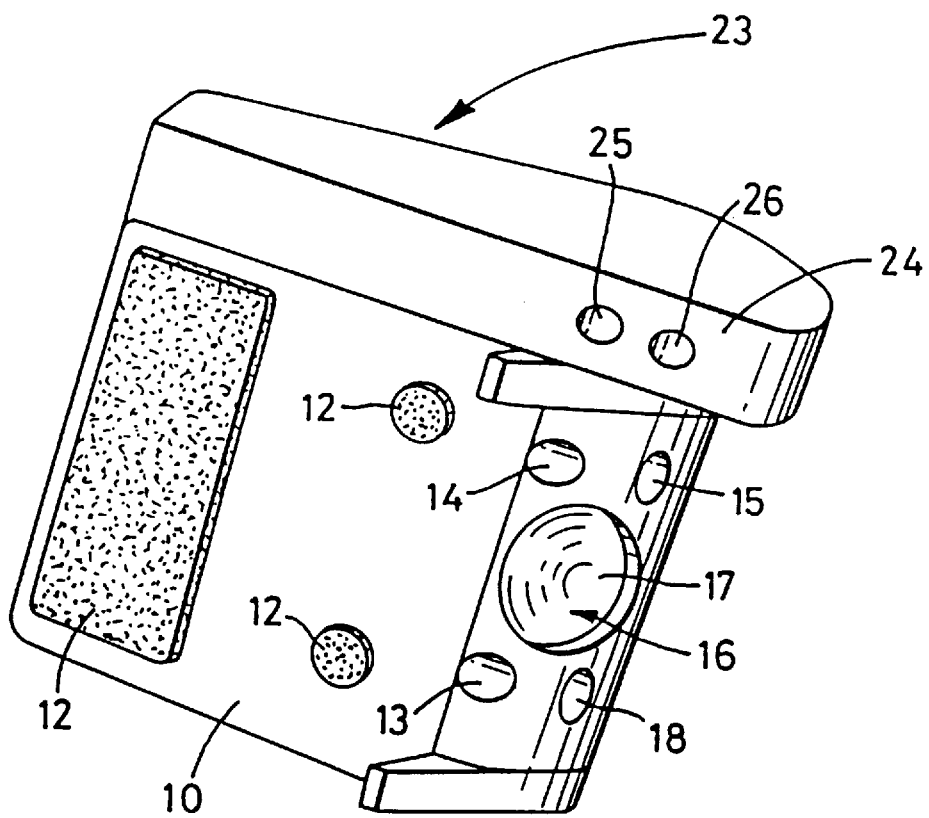
FIG. 5 is an perspective view from below of a second embodiment of detector.

The detector 23 shown in FIG. 5 is identical in most respects to that shown in FIGS. 2 and 3 and similar features have been given the same reference numerals. However, this detector 23 comprises an extended finger 24 at one side of the housing 10 which in use overhangs the inner edge of the casing 2. In the underside of the finger 24 is a fifth yellow modulated light source 25, again preferably a yellow LED emitting in the region of 570 nm with a 125 kHz modulation, and a silicon photodiode sensor 26 for receiving reflections of the emitted light. Such an LED has been found to give good contrast between the white ball and the background wood of the rim 3 and casing 2. Though other wavelengths are possible and may be better in other specific environments.

The light source 25 is used to shin e over the sloping rim 3 to enable the sensor to detect the position of the ball whilst it is travelling in the rim region as it passes underneath the sensor 26. Preferably, the light source 25 is located close to the casing 2 at the outer edge of the rim 3 to reduce specular reflections from the rim 3. Then either by measuring the periodic time per rotation or some equivalent procedure the angular velocity of the ball can be deduced. The direction of rotation can similarly be established with a suitable sensor arrangement. Once the angular velocity of rotation is available during a given spin or game, appropriate software can be used to predict approximately the time of the impending fall of the ball from the rim towards the cylinder 4. A warning signal can thus be issued somewhat earlier.

As the fall of a ball from the rim 2 is dependent on, many factors such as the ball's mass and frictional properties with respect to the surface of the rim 3 and casing 2, the software operates by continuously analysing the results of the spins of the ball in the wheel 1 and effectively learning when any given ball is likely to fall. Typically nine sample spins of a ball are required to enable the software to predict accurately the time of an impending fall. A "rien ne va plus" warning can then be signalled appropriately as required by the casino between two and five revolutions prior to the impending fall.

It will be appreciated that whilst the light source 25 and sensor 26 can operate independently of the light sources 13, 14, 15, 18 and the sensor 16, the sensor 26 could comprise a fibre optic connection to the main sensor 16. In this latter case a single sensing channel system is maintained, effective operation of the sensor 26 being phased with operation of the sensor 16.

Thus the detection system according to the present invention by using light in the visible spectrum, illuminating the sensed region with a suitably modulated light source, and placing the illuminating source in such a position as to direct specular reflections away from the sensor provides a reliable method of detecting the position of a ball in a moving roulette wheel which overcomes many of the disadvantages of conventional systems. In addition, unlike conventional systems it provides a means whereby a "rien ne va plus" warning can be signalled and has the advantage that only a single optical receive channel is required.

I claim:

1. A method of detecting a position of a ball on a roulette wheel with a rotatable cylinder comprising the steps of:

illuminating a numbers ring of the cylinder with light from two spatially displaced light sources;

illuminating a ring of pockets of the cylinder with light to detect a presence of the ball;

sensing reflections of the illuminating light by the numbers ring, the ring of pockets and the ball; and analyzing the reflections to determine an angular position of the cylinder within the wheel and the location of the ball relative thereto, wherein the illuminating light is of at least one specific wavelength which has been modulated, and the sensed reflections comprise at least one similarly modulated wavelength, said wavelength being predetermined dependent on the relative chrominance of the rotatable cylinder.

2. The method as claimed in claim 1, wherein the light used to illuminate the numbers ring of the wheel has a wavelength of approximately 670 nm and the light used to illuminate the ring of pockets has a wavelength of approximately 570 nm.

3. The method as claimed in claim 1, wherein a frequency of modulation of the illuminating light is an integer multiple of an electrical supply frequency.

4. The method as claimed in claim 1, wherein a frequency of modulation of the illuminating light is an integer reciprocal of an electrical supply frequency.

5. The method as claimed in claim 1, wherein a frequency of modulation of the illuminating light is substantially greater than an electrical supply frequency.

6. A roulette wheel comprising:

a static outer portion within which is mounted a rotatable cylinder with an outer numbers ring and a ring of pockets; and a detection means mounted on the outer portion for detecting a location of a roulette ball in relation to the wheel, said detection means comprising:

a light source operative to emit visible light which is directed at the numbers ring and the ring of pockets, said light source having at least one specific wavelength which is modulated and predetermined dependent on a relative chrominance of the rotatable cylinder and the ball;

a sensor means operative to receive light reflected by the rotatable cylinder and the ball located thereon, said sensor means for detecting at least one modulated wavelength similar to said at least one specific wavelength emitted by the light source; and means for analyzing the reflected light to determine a position of the rotatable cylinder and the location of the ball in relation thereto.

7. The roulette wheel as claimed in claim 6, wherein the static outer portion comprises an annular casing surrounding an inwardly sloping rim which surrounds the cylinder, said detection means being mounted on the annular casing wherein the light source is oriented with respect to the numbers ring and the ring of pockets so as to direct specular reflections away from the sensor means.

8. The roulette wheel as claimed in claim 6, wherein the detection means comprises an additional light source and an additional sensor means which are operative respectively to emit modulated visible light over a broadband visible light range directed on to the static outer portion of the wheel and to receive reflections of said emitted light for detecting the presence of the ball while the ball is spinning in the static outer portion of the wheel.

9. The roulette wheel as claimed in claim 6, wherein the detection means comprises computational means for analyzing a motion of the ball relative to the wheel so as to predict the ball's fall from the outer portion towards the cylinder.

10. The roulette wheel as claimed in claim 9, wherein the prediction of the ball's fall is used to trigger a warning system a predetermined number of revolutions of the ball prior thereto.

11. The roulette wheel as claimed in claim 6, wherein the light source is operative to transmit light over a modulated broadband visible light range.

12. The roulette wheel as claimed in claim 6, wherein the sensor means is operative to detect modulated wavelengths over a broadband visible light range.

13. The roulette wheel as claimed in claim 6, wherein the light source comprises at least three individual light sources, two of the light sources being directed at spatially displaced positions of the numbers ring of the cylinder in order to determine a direction of movement and velocity, and at least one individual light source being directed at the ring of pockets to detect a presence of the ball.

14. The roulette wheel as claimed in claim 13, wherein the two light sources directed at the numbers ring are operative to transmit at a wavelength of approximately 670 nm and said at least one light source directed at the ring of pockets is operative to transmit at a wavelength of approximately 570 nm.

15. The roulette wheel as claimed in claim 6, wherein the light source comprises at least one light emitting diode.

16. The roulette wheel as claimed in claim 6, wherein the sensor means comprises a single optical receive channel.

* * * * *